United States Patent [19]

Harvey

[11] Patent Number: 4,540,265
[45] Date of Patent: Sep. 10, 1985

[54] ENERGY-SAVING ELECTRONIC FLASH APPARATUS

[75] Inventor: Donald M. Harvey, Rochester, N.Y.

[73] Assignee: Eastman Kodak Company, Rochester, N.Y.

[21] Appl. No.: 627,179

[22] Filed: Jul. 2, 1984

Related U.S. Application Data

[63] Continuation-in-part of Ser. No. 460,422, Jan. 24, 1983, abandoned.

[51] Int. Cl.³ .................... G03B 15/03; G03B 15/05
[52] U.S. Cl. .................................. 354/417; 354/418; 315/241 P
[58] Field of Search ............... 354/413, 416, 417, 418, 354/127.11, 127.12, 145.1; 315/241 P

[56] References Cited

U.S. PATENT DOCUMENTS

| | | | |
|---|---|---|---|
| 4,249,110 | 2/1981 | Dick | 315/241 P |
| 4,258,991 | 3/1981 | Kuraishi | 354/32 |
| 4,486,086 | 12/1984 | Kresock | 354/416 X |

FOREIGN PATENT DOCUMENTS

| | | |
|---|---|---|
| 1374245 | 11/1974 | United Kingdom . |
| 1374247 | 11/1974 | United Kingdom . |
| 1462987 | 1/1977 | United Kingdom . |
| 1479844 | 7/1977 | United Kingdom . |

*Primary Examiner*—L. T. Hix
*Assistant Examiner*—Douglas S. Lee
*Attorney, Agent, or Firm*—Dennis P. Monteith

[57] ABSTRACT

An energy-saving electronic flash unit for a rapid sequence of flash exposures includes status indicator apparatus operable for signaling the readiness of the flash unit for the next flash in the sequence as a function of the flash energy expended to produce the previous flash. When the energy retained by a flash-firing capacitor at the termination of the preceding flash exceeds the energy expended in producing that flash, energy-monitoring circuitry causes a status indicator device to signal that the flash unit is sufficiently charged for the next exposure in the sequence.

7 Claims, 1 Drawing Figure

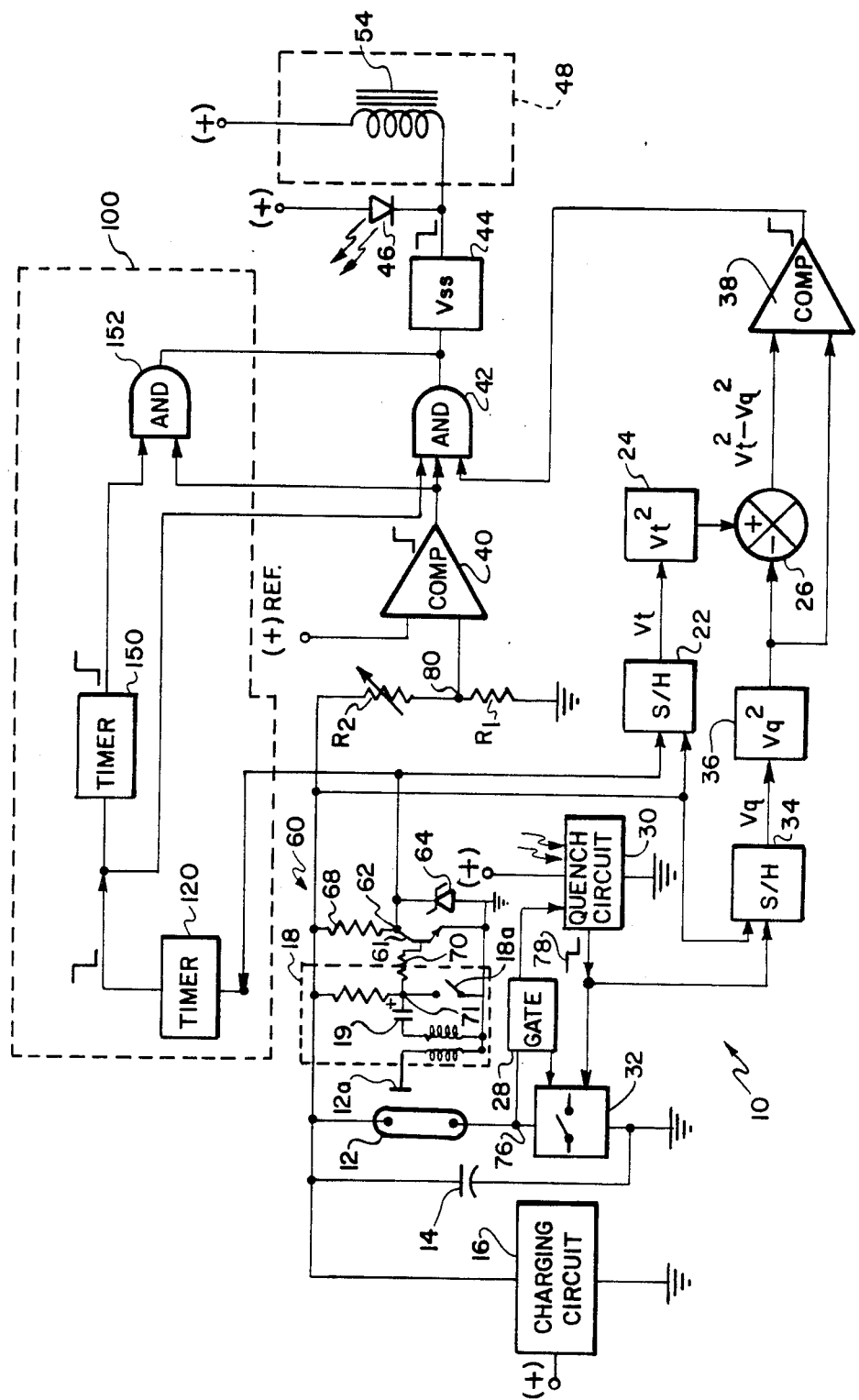

ENERGY-SAVING ELECTRONIC FLASH APPARATUS

CROSS-REFERENCE TO A RELATED APPLICATION

This application is a continuation-in-part of U.S. patent application Ser. No. 460,422, filed Jan. 24, 1983 abandoned, by Donald M. Harvey, and entitled Electronic Flash Apparatus.

BACKGROUND OF THE INVENTION

1. Field Of The Invention

The present invention relates to energy-saving electronic flash apparatus and, more particularly, to apparatus for signaling the readiness of the flash apparatus for an exposure operation.

2. Description Relative to the Prior Art

Many commercially available electronic flash units monitor the voltage on a flash-firing capacitor and, via a ready lamp or by enabling a shutter release mechanism in an associated camera, inform a camera operator when there is sufficient firing voltage for a flash exposure. In some electronic flash units, the firing voltage is considered to be sufficient when the capacitor is charged above a predetermined voltage level that corresponds to the minimum voltage required to ignite the flash tube. This arrangement has the advantage of permitting a rapid sequence of flash exposures but suffers the risk of underexposing subjects located beyond the flash distance corresponding to the minimum flash tube firing voltage.

In other electronic flash units, the firing voltage is considered to be sufficient when the flash-firing capacitor is charged above a predetermined voltage threshold that is a given percentage of the maximum operating voltage of the flash unit. Typically, the threshold voltage produces flash illumination that results in an underexposure of about one half to two thirds of a stop from the flash illumination that is produced when the capacitor is fully charged. Although this arrangement has the advantage of providing adequate flash illumination for subjects at the maximum flash distance, it suffers the disadvantage of preventing a more rapid sequence of exposures of subjects at the near end of the flash exposure range.

U.S. Pat. No. 4,258,991 discloses an electronic flash unit having a plurality of light emitting diodes (LED's) which successively and stepwise emit light as the charging voltage across the flash capacitor increases to corresponding predetermined voltage levels. Subject distances are marked in association with the LED's so that the distance corresponding to an LED that is energized is approximately the subject distance at which the operator can take an adequately exposed flash picture. Disadvantages of this arrangement are that (1) the operator must be an accurate judge of distance, and (2) if the photographic subject is located between the distances marked by two successive LED's, the operator usually waits for the flash unit to charge beyond the time that is necessary to provide adequate flash illumination.

SUMMARY OF THE INVENTION

In view of the foregoing, an object of the present invention is to provide flash status indicator apparatus that enables flash exposures to be made at the most rapid rate possible, without significant risk of unacceptable flash underexposure. Underlying the achievement of this object is an assumption that scene conditions, such as subject range, reflectivity and ambient luminance, do not change significantly when two exposures are made in rapid sequence. Accordingly, this object is accomplished in an energy-saving electronic flash unit in which energy-monitoring circuitry measures the flash energy consumed to produce the preceding flash, to determine whether or not there is adequate flash energy to produce the next flash. The present invention thus differs significantly from the above described prior art in that a subsequent flash exposure operation is controlled as a function of the flash energy consumed for the preceding exposure, rather than merely as a function of whether or not the flash apparatus is charged above some arbitrary voltage level.

When multiple flash exposures are taken in rapid sequence, for example less than one second apart, it is not likely that significantly more flash illumination will be needed from one exposure to the next. Thus, controlling flash status indicator apparatus as a function of the flash energy consumed for the immediate past flash exposure should almost always provide an accurate indication of the readiness of the flash unit for the next exposure in the sequence.

In a preferred embodiment of the invention, the energy-monitoring circuitry includes a first sample-and-hold circuit that produces a first monitoring voltage corresponding to the voltage on a flash-firing capacitor when the flash tube is triggered. A second sample-and-hold circuit produces a second monitoring voltage corresponding to the voltage on the flash-firing capacitor at the time the flash tube is quenched. First and second multiplying circuits, responsive respectively to the outputs of the first and second sample-and-hold circuits, produce output signals that are equal to the squares of the first and second monitoring voltages, respectively. These output signals correspond to the electrical energy stored by the flash-firing capacitor at the time that the flash tube is respectively triggered and quenched. A difference circuit, coupled to the outputs of the multiplying circuits, produces a difference signal corresponding to the difference between the signals produced by the multiplying circuits. Thus, the difference signal corresponds to the flash energy consumed to produce the preceding flash. A comparator circuit compares the difference signal to the aforementioned signal corresponding to the energy stored by the capacitor when the flash tube is quenched, to determine whether or not the flash unit has adequate energy for the next flash exposure operation.

The invention and its objects and advantages will become more apparent by referring to the accompanying drawing and to the following detailed description of a preferred embodiment.

BRIEF DESCRIPTION OF THE DRAWING

The drawing illustrates, in partly schematic and partly block form, an energy-saving electronic flash unit incorporating preferred embodiments of the present invention.

DETAILED DESCRIPTION OF PREFERRED EMBODIMENTS

Because electronic flash units are well known, the present invention will be directed in particular to elements forming part of, or cooperating directly with, the present invention. It is to be understood that flash elements not specifically shown or described herein may be selected from those known in the electronic flash unit art.

Referring now to the drawing, an energy-saving, series-quench electronic flash unit, generally indicated by the reference numeral 10, includes a flash tube 12 for emitting flash illumination, a storage capacitor 14 for supplying energy to the flash tube, and a battery-powered charging circuit 16 for charging the capacitor 14.

A conventional trigger circuit 18 includes a trigger capacitor 19 which discharges to produce a flash tube trigger pulse when a synchronous trigger switch 18a interlocking with a camera shutter (not shown) is momentarily closed. The trigger circuit 18 can trigger the flash tube 12 in rapid succession because the trigger capacitor rapidly recharges when the trigger switch 18 returns to its open position after the flash tube 12 is triggered.

When a trigger pulse is applied to a trigger electrode 12a of the flash tube 12, the gas within the flash tube is ionized which decreases the impedance between the flash tube electrodes. The capacitor 14 discharges through the tube 12, which produces light in proportion to the amount of energy discharged from the capacitor.

In the absence of automatic energy-saving quench circuitry to be described, the flash tube 12 would continue to emit light until the charge on the capacitor 14 drops below a level that is necessary to maintain conduction of the tube. However, when the photographic subject requires less flash illumination than the energy-saving flash unit 10 is capable of providing, the flash tube 12 is extinguished prior to the expenditure of the full amount of energy stored by the capacitor 14.

In accordance with the invention, energy-monitoring circuitry 60 is provided for measuring the energy expended each time the flash unit 10 is fired. In a preferred embodiment of the invention, the circuitry 60 operates to measure the expended energy by determining the difference between the energy stored by the capacitor 14 when the flash unit 10 is triggered and when the flash unit is quenched.

To determine the flash energy when the flash unit 10 is triggered, the circuitry 60 includes a sample-and-hold circuit 20 for sampling the voltage across the capacitor 14 in synchronism with the triggering of the flash tube 12. For that purpose, a gating device 61, in the form of an NPN transistor, is arranged to cause a synchronization voltage pulse to be supplied to a sample-and-hold circuit 22, to provide for the operation of the circuit 22 in synchronism with the triggering of the flash tube 12. As shown in the drawing, the collector of the transistor 61 is connected to a junction 62 common to the cathode of a zener diode 64, and a resistor 68. The emitter of the transistor 61 is connected to ground, so that the collector-emitter path of the transistor is in parallel with the zener diode 64. The base of the transistor 62 is connected through a resistor 70 to a junction 71 common to the trigger switch 18a and the trigger capacitor 19 of the trigger circuit 18, whereby the base-emitter path of the transistor and the serially connected resistor 70 are in parallel with the trigger switch 18a.

The transistor 61 operates as follows to cause the operation of the sample-and-hold circuit 22 in synchronism with the triggering of the flash tube 12. Assuming that the trigger capacitor 19 of the trigger circuit 18 has its normal operating charge, the polarity of which is as shown in the drawing, then the electronic flash unit 10 is in condition to fire the flash tube 12 upon the closing of the switch 18a. Prior to the triggering of the flash tube 12, the transistor 61 is forwardly biased, and is thereby conducting. In this condition, the junction 62 is clamped at a voltage that is only slightly above ground. Thus, the collector-emitter path of the transistor 61 effectively short circuits the diode 64, which is thereby turned off.

When the switch 18a is subsequently closed, to trigger the flash unit 10, the voltage at the junction 71 drops to ground, thereby removing the aforementioned forward bias from the base of the transistor 61. This turns the transistor 61 off, which removes the low voltage clamp at the junction 62. The voltage at the junction 62 rapidly rises to the breakdown voltage of the zener diode 64, thereby causing it to conduct. This momentarily clamps a voltage pulse at the junction 62 corresponding to the breakdown voltage of the diode 64, for operating the sample-and-hold circuit 22.

The sample-and-hold-circuit 22 is arranged to sample the charge on the capacitor 14 in response to the voltage pulse at the junction 62, and to thereby produce an output voltage, $V_t$, corresponding to the voltage stored by the capacitor 14. Thus, the circuit 22 produces a voltage $V_t$ corresponding to the voltage stored by the capacitor 14 at the time the flash tube 12 is triggered.

The sample-and-hold circuit 22 applies the voltage $V_t$ to a squaring circuit 24. The circuit 24 serves to produce an output signal that corresponds to the square of the voltage $V_t$, i.e. $V_t^2$. Because the energy E stored on a capacitor C is equal to $\frac{1}{2} CV^2$, the output signal $V_t^2$ is directly proportional to the energy stored on the capacitor 14 at the time the flash tube 12 is triggered.

When the flash tube 12 is triggered, a rapidly increasing voltage pulse appears at a junction 76 that is common to the flash tube 12, a gate 28, and a high-speed electronic switch 32, such as an SCR, serially connected to the tube 12. The gate 28, in response to the voltage pulse at the junction 76 causes both the switch 32 to close, thereby connecting the flash tube 12 to ground, and activates a light-sensitive quench circuit 30, which is arranged to detect the intensity of the light reflected from an object being photographed. Energy-saving flash apparatus having gating circuitry for operating a light-sensitive quench circuit and a serially connected switch in synchronism with the triggering of the flash tube is well known in the art. For example, U.S. Pat. No. 3,809,951 discloses an energy-saving flash unit having an RC gating circuit arranged to activate light-sensitive quench circuitry, and to cause an SCR, serially connected to a flash tube, to conduct, in synchronism with the triggering of a flash tube.

When the quench circuit 30 has received a predetermined quantity of light corresponding to a desired exposure, the circuit 30 produces a flash termination signal, denoted 78. The switch 32, in response to the signal 78, switches rapidly from a conductive condition to a nonconductive condition. When the switch 32 is off, further discharging of the capacitor 14 is terminated, whereby the flash unit 10 is quenched.

To determine the flash energy retained by the capacitor 14 when the flash unit 10 is quenched, the circuitry 60 includes a sample-and-hold circuit 34 for sampling the voltage across the capacitor 14 in synchronism with the extinguishing of the flash tube 12. For that purpose, an input of the circuit 34 is connected to the junction common to the output of the quench circuit 30 and the switch 32, to provide for the operation of the circuit 34 in response to the flash termination signal 78. Thus, the signal 78 serves to cause the operating of the sample-and-hold circuit 34 in synchronism with the quenching of the flash tube 12.

The sample-and-hold circuit 34, in response to the signal 78, samples the voltage across the capacitor 14, and produces an output voltage, $V_q$, corresponding to the voltage across the capacitor 14 when sampling occurs. Thus the voltage, $V_q$, corresponds to the voltage on the capacitor 14 at the time that the flash tube 12 is quenched.

The circuit 34 applies the voltage $V_q$ to a squaring circuit 36, which produces an output signal, $V_q^2$. For the same reason previously mentioned, the output signal $V_q^2$ is directly proportional to the energy stored on the capacitor 14. In this case, however, the signal $V_q^2$ corresponds to the energy retained by the capacitor 14 when the flash unit 10 is quenched.

The squaring circuit 36 applies its output signal $V_q^2$ to the inverting input terminal of a differential amplifier 26, which is arranged to operate as a subtraction circuit. As shown, the squaring circuit 24 applies its output signal to the non-inverting input terminal of the circuit 26. Thus, the subtraction circuit 26 produces a difference signal $V_t^2 - V_q^2$, which corresponds to the difference between the amount of energy stored by the capacitor 14 when the flash tube 12 is triggered and when the tube is extinguished. In other words, the difference signal $V_t^2 - V_q^2$ corresponds to the energy expended to fire the flash tube 12.

The difference signal $V_t^2 - V_q^2$, is applied to one input of a comparator 38. A second input of the comparator 38 receives the signal $V_q^2$ directly from the squaring circuit 36. When the signal $V_t^2 - V_q^2$ is equal to or greater than the signal $V_q^2$, the comparator 38 produces a relatively low level output voltage. Conversely, when the signal $V_q^2$ is greater than the difference signal $V_t^2 - V_q^2$, the comparator 38 produces a high level output. Thus, the comparator 38 produces a low level output voltage when the energy expended to fire the flash tube 12 is greater than the energy retained by the capacitor 14 when the flash tube 12 is extinguished. Conversely, the comparator 38 produces a high level output voltage when the energy expended for the flash operation is less than the energy remaining when the flash unit 10 is quenched.

A voltage divider in parallel with the capacitor 14 and consisting of a fixed resistor $R_1$ and a serially connected variable resistor $R_2$, produces a voltage at a junction 80 that is proportional to the voltage on the capacitor 14. The voltage at the junction 80 is applied to one input of a comparator 40. The second input of the comparator 40 receives a reference voltage, which corresponds to the minimum voltage required to fire the flash tube 12. The resistor $R_2$ is adjusted such that when the voltage across the capacitor 14 is equal to the minimum voltage that is necessary to fire the flash tube 12, the voltage at the junction 80 is equal to the aforementioned reference voltage.

When the voltage across the resistor $R_1$ is greater than the reference voltage, the comparator 40 produces a relatively high level output voltage. Thus, the comparator 40 produces a relatively high level output voltage whenever the capacitor 14 is charged above a minimum voltage that is necessary to fire the flash tube 12.

The output voltages of the comparators 38 and 40 are applied to respective input terminals of an AND gate 42. When these input voltages are simultaneously at a high level, that is to say when (1) the energy stored on the capacitor 14 at flash quench is greater than the energy consumed to produce the flash and (2) the voltage across the capacitor 14 is greater than the minimum voltage required to fire the flash tube 12, the AND gate 42 provides a relatively high output voltage. On the other hand, whenever the energy stored by the capacitor 14 is less than the energy consumed for the preceding flash, or whenever the voltage stored across the capacitor 14 is less than the minimum voltage that is necessary to fire the flash tube 12, the AND gate 42 produces a relatively low output voltage.

A voltage-sensitive switch 44, such as a Schmitt trigger, receives the output voltage from the AND gate 42. The switch 44 is arranged to produce a low level output voltage in response to a high level voltage at its input. Thus, the switch 44 produces a low level output voltage when the energy stored by the capacitor 14 is greater than the energy consumed for the previous flash, and when the capacitor 14 has adequate voltage to fire the flash tube 12.

A flash status indicator device includes an LED 46 for indicating the readiness of the flash unit 10 for the next exposure. A low level output voltage from the switch 44 causes the LED 46 to turn on. The turning on of the LED 46 serves to signal to an operator that the flash unit 10 is charged sufficiently to expose the next subject with at least as much flash illumination as was used to expose the previous subject. As is also shown in the drawing, the low level output voltage of the switch 44 may also serve to cause the energizing of a coil 54, for causing the operating of a camera exposure control mechanism 48 such as a shutter or a diaphragm.

The controlling of the LED 46 as a function of the energy expended to produce the preceding flash is based on an assumption that the photographic conditions for the next exposure, such as subject distance, reflectivity, etc., have not changed significantly from the photographic conditions of the previous exposure, at least from the standpoint that additional flash illumination will not be required for the next exposure. When two exposures occur in rapid sequence, it is very likely that the second exposure will be made under approximately the same photographic conditions as existed when the preceding exposure was made. Conversely, the larger the time interval between successive exposures the greater the probability that the photographic conditions are materially different from one exposure to the next.

In an alternate preferred embodiment of the invention, timing circuitry 100 is included for overriding the operating of the energy-monitoring circuitry 60 whenever the elapse time between successive exposures is greater than a given amount, for example, one second. In other words, in the alternative embodiment the energy-monitoring circuitry 60 of the invention controls the LED 46 and the coil 48 only when the next exposure is to occur within one second after the previous exposure.

For that purpose, the timing circuitry 100 includes a timer 120 having an input connected to the aforementioned junction 62, and an output connected to an input of the aforementioned AND gate 42. The timer 120 is arranged to produce a relatively high level output voltage for a predetermined time interval of one second, and a relatively low level output voltage at the termination of the one second interval. The timer 120 may include a bank of serially connected multivibrators, respective outputs of which are combined to drive digital logic circuitry for producing the low level output voltage following the one second interval.

In the operation of the timing circuitry 100, the timer 120 produces a high level output voltage in response to the aforementioned synchronization voltage pulse at the junction 62. Thus, both the timer 120 and the sample-and-hold circuit 22 are operated in synchronism with the triggering of the flash tube 12.

The timer 120 produces its low level voltage one second after the flash tube 12 is triggered. This low level timing voltage causes the output of the AND gate 42 to assume a low level voltage condition, independently of the input voltages supplied by the comparator 38 and the comparator 40. Thus, the voltage-sensitive switch 44 is caused to produce a high level output signal, thereby turning off the indicating lamp 46 and preventing the shutter mechanism 48 from operating whenever at least one second has elapsed following the previous firing of the flash unit 10.

As described immediately above, the energy-monitoring circuitry 60 provides the sole control for the LED 46 when the electronic flash unit 10 is operated in a rapid sequence of less than one second between two consecutive exposures. When the time interval between consecutive flashes is far enough beyond that established by the timer 120 for a rapid picture-taking mode, the timing circuitry 100 causes the control of the LED 46 solely on the basis of whether or not the voltage stored on the capacitor 14 is at or above a predetermined level. In the alternate embodiment of the invention, the predetermined level corresponds to the minimum voltage that is required to fire the flash tube 12.

The control of the LED 46 in this manner is accomplished by a timer 150 and a serially connected dual-input AND gate 152, which are connected between the output of the timer 120 and the input of the voltage-sensitive switch 44, in parallel with the AND gate 42.

The timer 150 is arranged to operate in response to the output voltage of the timer 120 decreasing to a low level, and produces a high level output voltage after a predetermined time interval, for example one second. Thus, the timer 150 is arranged to produce a high level output voltage that is applied to the AND gate 152 two seconds after the flash tube 12 is triggered.

The second input of the AND gate 152 is connected directly to the output of the aforementioned comparator 40. Accordingly, the AND gate 152 produces a relatively high level voltage two seconds after the flash tube 12 is triggered if the flash capacitor 14 is charged above the minimum voltage that is necessary to fire the flash tube. In view of the foregoing, the LED 46 is now controlled after two seconds have elapsed solely on the basis of whether or not the voltage on the capacitor 14 is greater than the minimum voltage that is necessary to fire the flash tube 12. This 2-second interval allows the charging circuit 16 to more fully charge the capacitor 14 and thereby reduces the risk of underexposure. The disadvantage of a longer charging time interval is, of course, that the opportunity to take some flash exposures is lost. Conversely, a shorter time interval increases the operational speed of the flash unit 10 but also increases the risk of underexposure.

The invention has been described in detail with particular reference to two preferred embodiments thereof, but it will be understood that variations and modifications can be effected within the spirit and scope of the invention. For example, another input to the AND gate 42 could be supplied by an automatic camera focusing mechanism which provides a disabling low level signal or which changes the reference voltage representative of the minimum voltage required to fire the flash tube whenever the camera focus is changed to a longer range setting. Still another input to the AND gate 42 could be supplied by a third comparator which receives a reference signal and an exposure value signal representative of film speed, camera lens aperture, and the distance of the photographic subject from a rangefinder. Proportioning means could be provided for the inputs to the comparator 38 so that an enabling high level signal is provided to the AND gate 42 whenever the stored energy remaining on the capacitor can provide a predetermined fraction of the energy delivered to the flash tube 12 during the previous flash operation, such predetermined fraction being sufficient to produce an acceptable underexposure.

Furthermore, the energy-monitoring circuitry 60 could be arranged for measuring the energy discharged from the capacitor 14 as a function of the power dissipated in the flash tube 12. The energy remaining on the capacitor 14 could also be determined without the sampling of the capacitor voltage by regulating the charging of the capacitor 14 to a predetermined energy level prior to a flash. The energy remaining at flash quench could then be determined directly as a function of the energy consumed to produce the preceding flash.

I claim:

1. In electronic flash apparatus having energy-saving quench means actuatable for terminating the discharging of energy from an energy-storage capacitor to quench said flash apparatus, the improvement comprising:

energy-monitoring means, arranged for the measuring of energy resulting from the discharging of said capacitor for a flash-firing operation, for measuring the energy discharged relative to the energy retained by said capacitor at the termination of such flash-firing operation, to determine whether or not said capacitor retains adequate energy to produce an acceptable flash exposure of a subsequent scene under substantially the same exposure conditions as existed for the preceding flash exposure operation.

2. Electronic flash apparatus as claimed in claim 1 wherein said energy-monitoring means is operatively connected to said capacitor for measuring the energy discharged from said capacitor as a function of the voltage stored by said capacitor (1) at the initiating of a flash-firing operation, and (2) at the terminating of such flash-firing operation.

3. Electronic flash apparatus as claimed in claim 2 wherein said energy-monitoring means includes voltage sampling means, operatively connected to said capacitor, and voltage multiplying means, responsive to said voltage sampling means, for measuring the energy stored by said capacitor at the initiating of a flash-firing operation and at the terminating of such flash-firing operation.

4. Electronic flash apparatus as claimed in claim 3 wherein said voltage sampling means iccludes (1) first voltage sampling circuitry, responsive to the triggering of said flash apparatus, for measuring the voltage stored by said capacitor when said flash apparatus is triggered, and (2) second voltage sampling circuitry, responsive to said quench means, for measuring the voltage stored by said capacitor when said flash apparatus is quenched.

5. Electronic flash apparatus as claimed in claim 4 wherein said energy-monitoring means further includes first and voltage multiplying means, operably associated respectively with said first and second voltage sampling circuitry, for producing output signals corresponding respectively to the energy stored by said capacitor when said flash apparatus is triggered and when said flash apparatus is quenched.

6. Electronic flash apparatus as claimed in claim 1 including indicating means, responsive to said energy-monitoring means determining that the energy discharged during a flash exposure operation is less than the energy retained at the termination of such exposure operation, for providing a signal that indicates the readiness of said flash apparatus to expose a subsequent scene.

7. Electronic flash apparatus as claimed in claim 1 further including timing means for overriding the operating of said energy-monitoring means in response to the elapse of a given time interval relating to the firing of said flash apparatus.

* * * * *